(12) United States Patent
Atkinson et al.

(10) Patent No.: US 8,919,185 B2
(45) Date of Patent: Dec. 30, 2014

(54) SYSTEM AND METHOD FOR SWIRL GENERATION

(75) Inventors: Ian Atkinson, Ely (GB); Miriam Archer, Marlow (GB)

(73) Assignee: Schlumberger Technology Corporation, Cambridge, MA (US)

( * ) Notice: Subject to any disclaimer, the term of this patent is extended or adjusted under 35 U.S.C. 154(b) by 617 days.

(21) Appl. No.: 12/636,915

(22) Filed: Dec. 14, 2009

(65) Prior Publication Data

US 2011/0139902 A1 Jun. 16, 2011

(51) Int. Cl.
*G01N 1/00* (2006.01)
*G01F 1/32* (2006.01)
*G01F 1/44* (2006.01)
*G01F 1/74* (2006.01)
*G01F 1/50* (2006.01)

(52) U.S. Cl.
CPC .. *G01F 1/74* (2013.01); *G01F 1/32* (2013.01); *G01F 1/44* (2013.01); *G01F 1/50* (2013.01)
USPC .......................................................... 73/64.56

(58) Field of Classification Search
CPC ..................................... G01F 1/32; F15C 1/16
USPC ............................................ 73/64.56, 861.32
See application file for complete search history.

(56) References Cited

U.S. PATENT DOCUMENTS

| 3,643,431 A * | 2/1972 | Jamieson | 60/738 |
| 3,882,211 A * | 5/1975 | Kamp | 264/518 |
| 4,155,253 A | 5/1979 | Kato et al. | |
| 5,007,293 A | 4/1991 | Jung | |
| 5,203,211 A | 4/1993 | Jung | |
| 7,562,587 B2 | 7/2009 | Atkinson et al. | |
| 7,607,358 B2 | 10/2009 | Atkinson et al. | |
| 7,650,799 B2 | 1/2010 | Atkinson et al. | |
| 7,987,733 B2 | 8/2011 | Atkinson et al. | |
| 8,027,794 B2 | 9/2011 | Xie | |

(Continued)

FOREIGN PATENT DOCUMENTS

| GB | 2447490 A | 9/2008 |
| KR | 1020080006963 A | 1/2008 |
| WO | 2004106861 A2 | 12/2004 |
| WO | 2004106861 A3 | 2/2005 |

OTHER PUBLICATIONS

Atkinson et al: "New generation multiphase flowmeters from Schlumberger and Framo Engineering AS", 17th International North Sea Flow Measurement Workshop, Oslo, Norway, Oct. 25-28, 1999.

(Continued)

*Primary Examiner* — Peter MacChiarolo
*Assistant Examiner* — Alex Devito
(74) *Attorney, Agent, or Firm* — Steven A. Gahlings (57) ABSTRACT

An apparatus for producing swirling flow in a pipeline is provided. The apparatus comprises in flow series: an inlet pipe, a flow deflection section, and an outlet pipe. The inlet pipe is configured such that fluid arrives in the flow deflection section from the inlet pipe and the outlet pipe has one or more apertures formed in a radially outward side wall thereof for the entrance of fluid to the outlet pipe from the flow deflection section. The apertures are configured such that the entering fluid adopts a swirling flow in the outlet pipe. The flow deflection section is configured such that, in the flow deflection section, fluid arriving from the inlet pipe is deflected to a location radially adjacent the apertures while maintaining a substantial component of flow in said principal direction.

17 Claims, 4 Drawing Sheets

(56) References Cited

U.S. PATENT DOCUMENTS

| | | |
|---|---|---|
| 2008/0223146 A1 | 9/2008 | Atkinson et al. |
| 2009/0114038 A1 | 5/2009 | Atkinson et al. |
| 2009/0204346 A1 | 8/2009 | Xie |
| 2009/0229375 A1 | 9/2009 | Atkinson et al. |
| 2009/0234593 A1 | 9/2009 | Atkinson et al. |
| 2010/0299088 A1 | 11/2010 | Huang et al. |
| 2011/0098938 A1 | 4/2011 | Huang et al. |
| 2011/0112773 A1 | 5/2011 | Atkinson |

OTHER PUBLICATIONS

International Search Report of PCT Application No. PCT/IB2010/0002861 dated Jul. 18, 2011.

* cited by examiner

SYSTEM AND METHOD FOR SWIRL GENERATION

FIELD

The present invention relates to an apparatus for producing swirling flow in a pipeline.

BACKGROUND

The determination of gas and liquid flow rates in gas-liquid fluid mixtures is important in the oil and gas industry.

An example of an apparatus for measuring such flow rates is Schlumberger's Vx™ system (see e.g. I. Atkinson, M. Berard, B.-V. Hanssen, G. Ségéral, $17^{th}$ International North Sea Flow Measurement Workshop, Oslo, Norway 25-28 Oct. 1999 "New Generation Multiphase Flowmeters from Schlumberger and Framo Engineering AS") which comprises a vertically mounted Venturi flow meter, a dual energy gamma-ray hold up measuring device and associated processors. This system allows the simultaneous calculation of gas, water and oil volumetric flow rates in multi phase flows.

However, with conventional implementations of Vx™ technology the accuracy of the calculations starts to degrade as the gas volume fraction (GVF) increases above about 90%. In particular, at high GVF it can be difficult to determine properties of the liquid phase.

WO 2004/106861 proposes a multi phase flowmeter in which a twisted tape device is used to separate a liquid phase from a liquid-gas mixture into an annular film on the tube wall of a straight pipe section. Measurements are made to determine the liquid flow rate in the film. Following the straight pipe section, the liquid is re-entrained into the gas stream by an expansion contraction system. The homogenised flow is then passed to a Venturi.

GB A 2447490 proposes an apparatus for investigating the properties of a gas-liquid fluid mixture. The apparatus includes a conduit within which the fluid mixture is induced to swirl, for example, by a helical insert or vane assembly within the conduit, or a tangential flow inlet to the conduit. The swirling flow forces the liquid and gas to separate, the liquid forming a surface layer on the wall of the conduit. The separated swirling flow is then introduced into a Venturi, the liquid undergoing centrifugal acceleration in the throat of the Venturi. The apparatus may have a further upstream Venturi through which the mixture flows without swirling. Measurements, such as pressure differences, liquid layer velocities and liquid hold-ups, taken at suitable points along the flow allow, for example the gas and the liquid mass flow rates to be determined.

Thus swirling flows can be applied to develop apparatuses which allow useful measurements to be made on gas-liquid mixtures.

However, conventional devices for inducing swirling flow have disadvantages. Conventional tangential inlet devices tend to produce large pressure losses as the flow is directed around several 90° doglegs. They also have large footprints which can make their deployment impractical in the limited space of e.g. an offshore platform. Helical insert or vane assemblies produce lower pressure losses, but are less effective at swirling the flow.

SUMMARY

Thus an object of an embodiment of the present invention is to provide an apparatus for effectively producing a swirling flow. Aspects of an embodiment of the present invention may provide for effectively generating the swirl in a manner that does not cause excessive pressure losses and/or where the apparatus has a relatively small footprint.

Accordingly, a first aspect of the invention provides an apparatus for producing swirling flow in a pipeline, the apparatus comprising in flow series:

an inlet pipe;

a flow deflection section; and an outlet pipe, the flow in the inlet and the outlet pipes being in the same principal direction;

wherein:

the inlet pipe is configured such that fluid arrives in the flow deflection section from the inlet pipe flowing in an axial direction with respect to the inlet flow pipe;

the outlet pipe has one or more apertures formed in a radially outward side wall thereof for the entrance of fluid to the outlet pipe from the flow deflection section, the apertures being configured such that the entering fluid adopts a swirling flow in the outlet pipe, and the flow deflection section is configured such that, in the flow deflection section, fluid arriving from the inlet pipe is deflected to a location radially adjacent the apertures while maintaining a substantial component of flow in said axial direction.

In one embodiment of the present invention, the outlet flow pipe is coaxial with the inlet flow pipe and the principal direction of flow in the inlet and the outlet pipes is in the same axial direction.

Thus, in embodiments of the present invention, the flow may arrive at the swirl-producing apertures without having undergone large deflections away from said principal direction. This helps to avoid the large pressure losses associated with the doglegs of a conventional tangential inlet device. Further, the footprint of the apparatus can be kept relatively small. Appropriate configuration of the apertures formed in the radially outward side wall of the outlet pipe can, nonetheless, still produce high amounts of swirling flow.

The apparatus may have any one or, to the extent that they are compatible, any combination of the following optional features.

In an embodiment of the present invention, the flow deflection section may be configured such that between arriving in the flow deflection section from the inlet pipe and subsequently arriving at the location radially adjacent the apertures, the direction of flow of the fluid may be deflected by no more than about 80° away from said principal direction. In aspects of an embodiment of the present invention, the direction of flow of the fluid may be deflected by no more than about 60° or 45° away from said principal direction. This further helps to reduce pressure losses.

In some embodiments, the inlet pipe and the outlet pipe are coaxial.

In an embodiment of the present invention, the flow deflection section has a flow deflector for deflecting the fluid arriving from the inlet pipe, the flow deflector being provided at the upstream end of the outlet pipe facing the inlet pipe. Conveniently (for example when the inlet pipe and the outlet pipe are coaxial), the flow deflector can have a conical deflection surface which points towards the inlet pipe. For example, consistent with the above-mentioned maximum deflection angles, the half angle formed at the apex of the conical surface is preferably 80° or more preferably 60° or 45°.

In an embodiment of the present invention, the flow deflection section may be configured to produce a deflected flow which is rotationally symmetric about an axis which is coaxial with the inlet and outlet pipes.

In an embodiment of the present invention, the internal diameter of the flow deflection section may be greater than the internal diameters of the inlet and outlet pipes.

In some embodiments of the present invention, the apertures may comprise slots extending in the axial direction of the outlet pipe. In some aspects, the outlet pipe may have only one, two or three apertures. In other aspects, the outlet pipe may have four or more apertures. When the outlet pipe has plural apertures, in an embodiment of the present invention, these apertures may be circumferentially spaced around the pipe. Merely by way of example, in one embodiment of the present invention, the outlet pipe may have two, diametrically opposed apertures.

In an embodiment of the present invention, the outer surface of the radially outward side wall of the outlet pipe may be smooth, i.e. without projections, so that disturbance to the flow entering the apertures is reduced and the fluid arriving at the apertures maintains a substantial component of flow in said principal direction.

The ratio of the total cross-sectional flow areas of the apertures to the cross-sectional flow area of the outlet pipe may be in range from 1:4 to 1:8. This ratio may play a significant role in determining the angle of swirl and the tangential velocity:axial velocity ratio in the outlet pipe. For example, in a single phase flow, conservation of volume requires that tangential velocity/axial velocity=(area of the outlet pipe/total aperture flow areas)$^2$, while angle of swirl=tan$^{-1}$(tangential velocity/axial velocity).

The thickness of the radially outward side wall of the outlet pipe can be in the range from 1% to 10% of the internal diameter of the outlet pipe. Surprisingly, even such a relatively small thickness can be sufficient to allow the apertures to be configured to produce a swirling flow. For example, the apertures can have side surfaces formed by the thickness of the radially outward side wall of the outlet pipe, the side surfaces being angled relative to the respective radial directions of the outlet pipe at the side surfaces to generate the swirling flow. In particular, the angled side surfaces may be tangential to, or parallel to the tangents of, the inner surfaces of the radially outward side wall at the respective positions of the apertures.

In an embodiment of the present invention, the inlet and outlet pipes have the same diameter. This allows the apparatus easily to be installed in a length of existing pipeline.

In some embodiments, the inlet and outlet pipes extend horizontally.

A second aspect of the invention provides a device for investigating the properties of a gas-liquid fluid mixture, the device comprising:

an apparatus according to the first aspect for producing swirling flow in a gas-liquid fluid mixture (the apparatus optionally having any one or, to the extent that they are compatible, any combination of the optional features of the first aspect), a conduit for receiving the swirling the flow, the conduit having a first constriction region providing a reduced conduit cross section, and a measurement assembly for determining one or more properties of the liquid as it flows through the constriction region.

Thus, the device may comprise an apparatus as described in GB 2447490, the entire disclosure of which is incorporated herein for all purposes, but with an apparatus according to the above first aspect for producing the swirling flow.

A third aspect of the invention provides the use of an apparatus according to the first aspect for producing swirling flow in a gas-liquid fluid mixture.

A fourth aspect of the invention provides an oil well or a gas well pipeline fitted with an apparatus according to the first aspect or a device according to the second aspect.

Again, in the third and fourth aspects, the apparatus of the first aspect may optionally have any one or, to the extent that they are compatible, any combination of the optional features of the first aspect.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Embodiments of the invention will now be described by way of example with reference to the accompanying drawings in which.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth herein.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
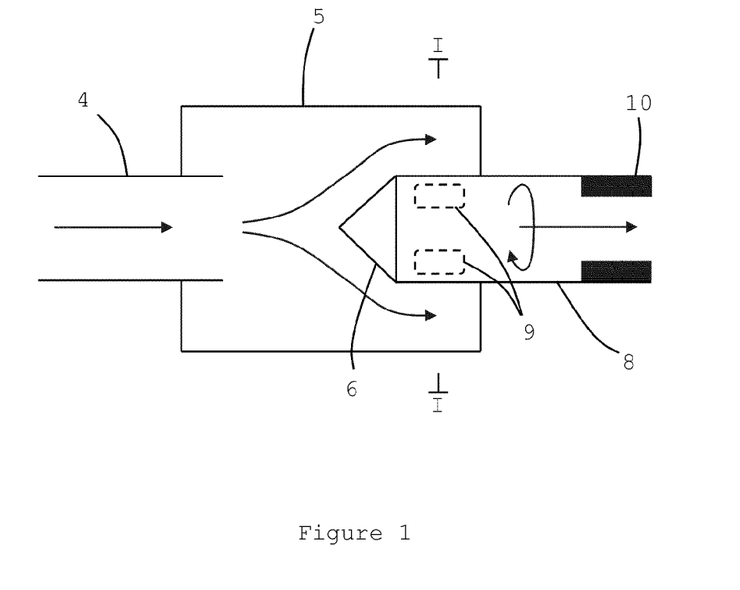
FIG. 1 shows schematically a longitudinal cross-section through an apparatus according to an embodiment of the present invention.

FIG. 1 shows schematically a longitudinal cross-section through an apparatus according to an embodiment of the present invention. An inlet pipe 4 introduces a fluid flow into a deflection section 5. The deflection section has an increased internal diameter relative to the inlet pipe, and a conical deflection surface 6 located in the deflection section pointing towards the inlet point, expands the flow around an outlet pipe 8, which is coaxial with the inlet pipe. Slots 9 aligned with the axial direction of the outlet pipe and formed in the radially outer side wall of the outlet pipe introduce the expanded flow into the outlet pipe and cause the flow to swirl. For a gas-liquid flow, the swirl causes the liquid and gas to separate, with the liquid forming a layer 10 on the wall of the outlet pipe.

Flow directions are indicated by arrows. In the inlet 4 and outlet 8 pipes the principal direction of flow is the same and along the common axis of the pipes. In the deflection section 5, although the flow is deflected away from this axial direction as it expands around the outlet pipe, the flow maintains a substantial component of flow in the axial direction. This helps to reduce pressure losses in the apparatus.

Figure 2:
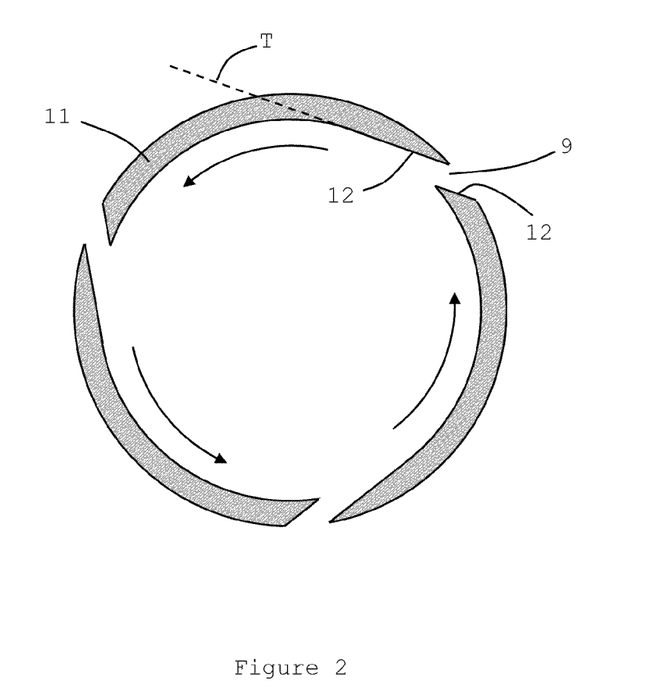
FIG. 2 shows schematically a transverse cross-section on the plane I-I of FIG. 1.

FIG. 2 shows schematically a transverse cross-section on the plane I-I through the radially outer wall 11 of the outlet pipe 8. Side surfaces 12 of each slot 9 are aligned with the tangent T to the inner surface of the wall of the outlet pipe at the position of the slot. This alignment, over even the relatively short distance of the thickness of the wall, is enough for the slot to cause the fluid entering the outlet pipe to adopt a swirling motion.

Figure 3:
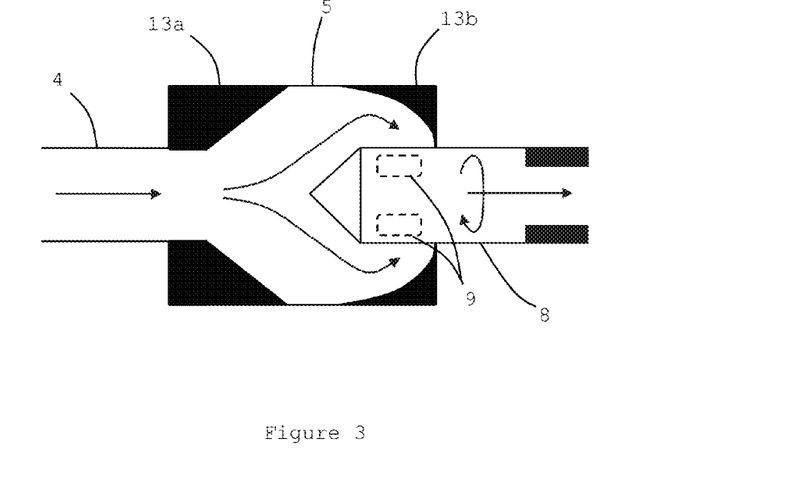
FIG. 3 shows schematically a longitudinal cross-section through a further apparatus according to an embodiment of the present invention.

FIG. 3 shows schematically a longitudinal cross-section through a further apparatus according to an embodiment of the present invention. The further apparatus is identical to that of FIG. 1, except that the deflection section 5 has profiled inserts 13a and 13b, which help to reduce pressure losses in the apparatus still further. In particular, the profiled inserts 13b encourage the flow to turn in towards the apertures 9.

Experiments were performed to determine the performance of various swirl generating apparatuses. The experiments used a test section, shown schematically in side view in FIG. 4, consisting of a 47 mm internal diameter swirl generator 1 followed by a Venturi 2 with a 20 mm internal diameter throat, both the swirl generator and the Venturi being placed in a two phase air and water horizontal flow loop.

Figure 4:
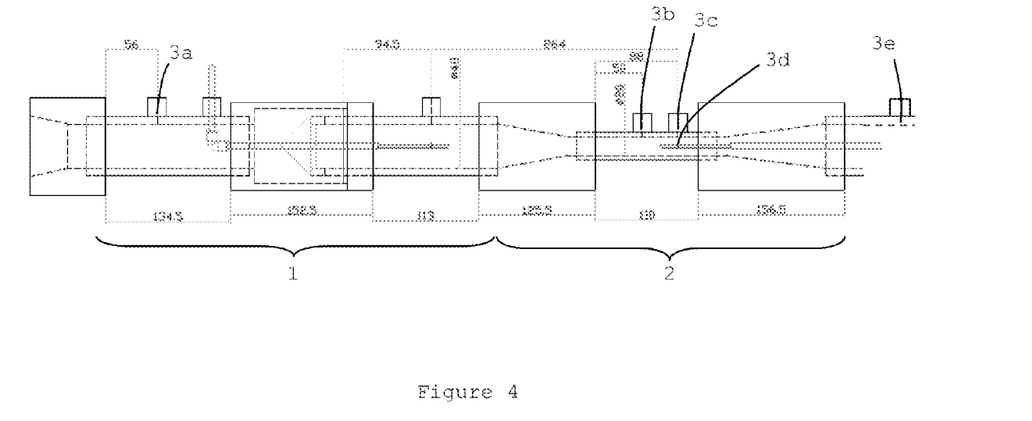
FIG. 4 shows a schematic longitudinal side view of an experimental test section, in accordance with an embodiment of the present invention.

To determine swirl effectiveness and pressure losses for different swirl generators, single phase air tests and single phase water tests were performed. The flow rates for the air tests varied from 0 to 100 $m^3$/hr at line conditions in the throat in increments of 10 $m^3$/hr. The flow rates for the water tests varied from 0 to 5 $m^3$/hr in increments of 1 $m^3$/hr. Pressure readings were taken at a number of wall and centreline positions 3a to e.

The swirl generators tested were: three apparatuses according to respective embodiments of the present invention, a conventional tangential inlet device, and a conventional impeller device. Each generator was subject to both single phase air tests and single phase water tests, except for the conventional tangential inlet device which was only subject to the single phase water test.

The three embodiments differed from each other by the number of slots into the outlet pipe. One embodiment had a single slot, another had two diametrically opposed slots, and the third had three equally circumferentially spaced slots as shown in FIG. 2. By varying the slot length while maintaining the slot width constant, the total slot cross-sectional flow area was kept the same, however, for the three embodiments. The ratio of the total cross-sectional flow areas of the slots to the cross-sectional flow area of the outlet pipe was 1:5.7. In contrast, the ratio of the cross-sectional flow areas of the tangential inlet pipe to the cross-sectional flow area of the outlet pipe of the conventional tangential inlet device was 1:4.

Figure 5:
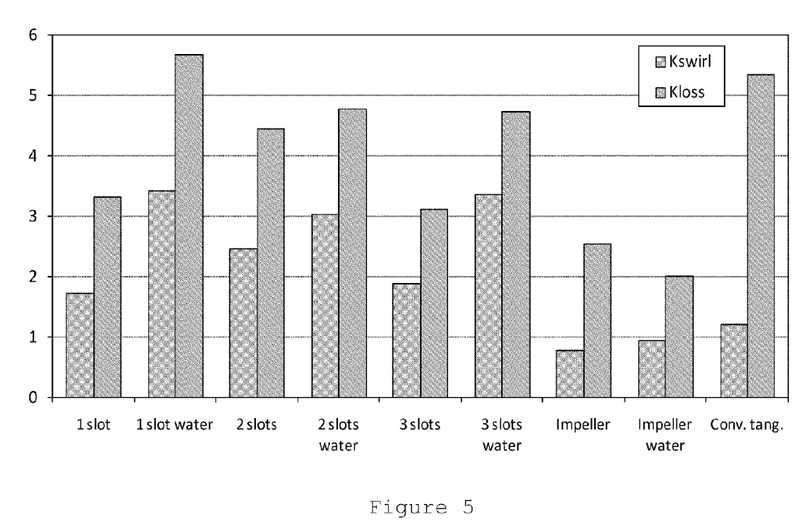
FIG. 5 is a bar chart of swirl to loss ratio for systems in accordance with an embodiment of the present invention.

Swirl and pressure loss in single phase flow were investigated for the five swirl generators. Amount of swirl was determined by plotting wall to centre-line differential pressure at the Venturi throat (i.e. between positions 3c and 3d) against the dynamic pressure at the throat (determined using the pressure measured at position 3c), the gradient giving a measure of the amount of swirl generated, $K_{swirl}$. Pressure loss was determined by plotting the total pressure drop across the swirl generator 1 and the Venturi 2 (i.e. between positions 3a and 3e) against the dynamic pressure at the Venturi throat, the gradient giving a measure of pressure loss, $K_{loss}$. FIG. 5 summarises $K_{swirl}$ and $K_{loss}$ for the results in bar chart form, and FIG. 5 is a bar chart of swirl to loss ratio for the experiments.

The results show that the embodiments of the present invention generate more swirl than the conventional tangential inlet and conventional impeller devices. Further, the embodiments have less pressure loss than the conventional tangential inlet device, except for the embodiment with only one slot.

Figure 6:
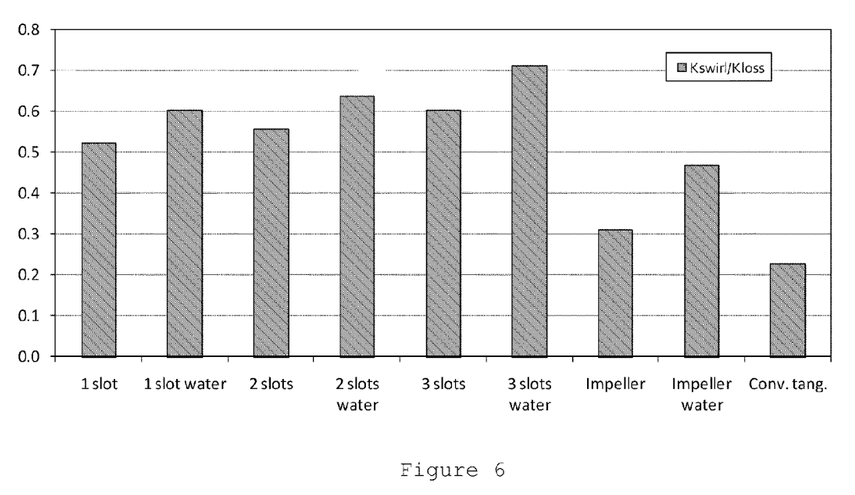
FIG. 6 is a bar chart of the ratio of swirl to loss ratio for systems in accordance with an embodiment of the present invention.

The lower inlet to outlet area ratio of 1:5.7 for the embodiments relative to the corresponding 1:4 ratio for the conventional tangential inlet device provides at least a partial explanation for the higher swirl produced by the embodiments than the conventional tangential inlet device. However, as shown in FIG. 6, the embodiments are nonetheless more efficient at generating swirl. The swirl to loss ratios of the embodiments is about three times higher than that of the conventional tangential inlet device. The impeller device has a higher swirl to loss ratio than the conventional tangential inlet device, but still not as high as those of the embodiments.

Experiments were then performed to determine the circularity of the gas core produced the embodiments when swirling a two phase air-water flow. In these experiments, the water flow rate varied from 0 to 5 m³/hr and air flow rate varied from 0 to about 25 m³/hr at line conditions in the Venturi throat in increments of 1 m³/hr for the water and increments of 0.1 GVF (gas volume fraction) for the gas, up to GVF=0.9. The instantaneous thicknesses of the liquid layer at top and bottom pipe locations for the Venturi inlet and throat were measured by ultrasonic transducers. To quantify the deviation from a symmetrical gas core, the mean squared error, MSE, of the thickness measurements was calculated for respectively the inlet and throat using the following expression:

$$MSE = \frac{\sum_{i=1}^{n}(t_{top}(i) - t_{btm}(i))^2}{n}$$

where n is the number of different water and air flow rate combinations, $t_{top}$ is a thickness measurement from a top pipe location, and $t_{btm}$ is a thickness measurement from a bottom pipe location.

Figure 7:
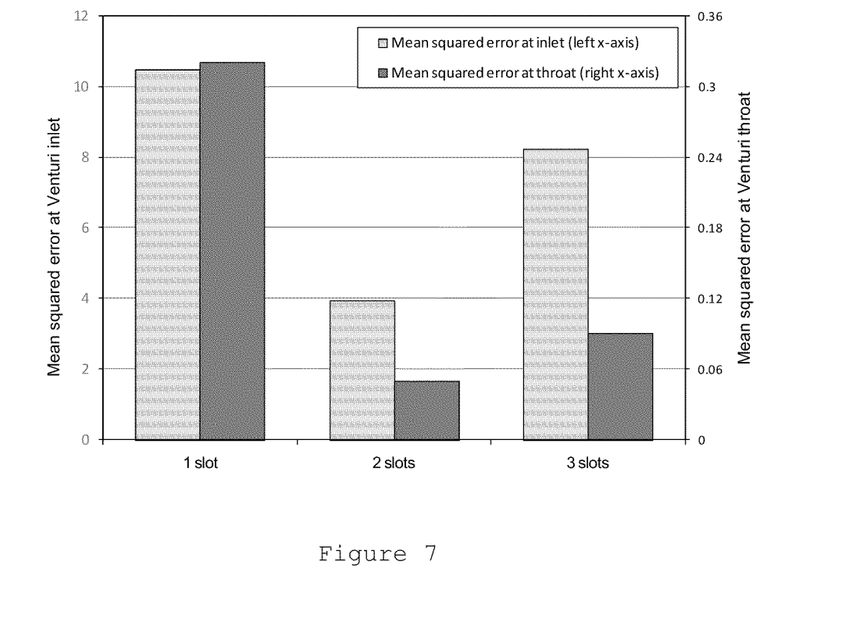
FIG. 7 is a bar chart of mean squared errors in thickness measurements for systems in accordance with an embodiment of the present invention.

FIG. 7 is a bar chart which plots the MSE values for the three embodiments. In all cases the MSE is much less at the throat than at the inlet, meaning that the gas core is more symmetrical about the pipe axis at the throat. This is probably because the angular velocity is higher in the throat due to some conservation of angular momentum, and therefore the centrifugal force which generates the separation is greater. The order from most symmetrical to least symmetrical is the same at the Venturi inlet as at the throat and, in order from most to least symmetrical, is two slots, three slots, and then one slot, the two slot embodiment producing a significantly more symmetrical gas core than the other two embodiments.

While an embodiment of the present invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An apparatus for producing swirling flow in a pipeline, the apparatus comprising in flow series:
    an inlet pipe;
    a flow deflection section;
    a flow deflector, wherein the flow deflector comprises a conical deflection surface disposed in the flow deflection section at the upstream end of the outlet pipe facing the inlet pipe, and wherein the conical flow deflection surface points towards the inlet pipe; and
    an outlet pipe; wherein:
        the inlet pipe is configured such that fluid arrives in the flow deflection section from the inlet pipe flowing in an axial direction with respect to the inlet flow pipe;
        the outlet pipe has one or more apertures formed in a radially outward side wall thereof for the entrance of the fluid to the outlet pipe from the flow deflection section, the apertures extending in an axial direction along the sidewall and being configured such that the fluid entering the outlet pipe through the apertures adopts a swirling flow in the outlet pipe;
        the flow deflection section is configured to produce a deflected flow of the fluid that is rotationally symmetric about an axis that is coaxial with the inlet and outlet pipes; and
        the radially outward side wall of the outlet pipe in which the apertures are formed is smooth without projections thereon to provide that disturbance of fluid flow entering the apertures is reduced and the fluid arriving at the apertures maintains a substantial component of flow in said axial direction.

2. An apparatus according to claim 1, wherein the outlet flow pipe is coaxial with the inlet flow pipe and the principal direction of flow in the inlet and the outlet pipes is in the same axial direction.

3. An apparatus according to claim 2, wherein the flow deflection section is configured such that between arriving in the flow deflection section from the inlet pipe and subsequently arriving at the location radially adjacent the apertures, the direction of flow of the fluid is deflected by no more than about 80° away from said principal direction.

4. An apparatus according to claim 1, wherein the flow deflection section has a flow deflector (6) for deflecting the fluid arriving from the inlet pipe, the flow deflector being provided at the upstream end of the outlet pipe facing the inlet pipe.

5. An apparatus according to claim 1, wherein the flow deflection section is configured to produce a deflected flow which is rotationally symmetric about an axis which is coaxial with the inlet and outlet pipes.

6. An apparatus according to claim 5, wherein the internal diameter of the flow deflection section is greater than the internal diameters of the inlet and outlet pipes.

7. An apparatus according to claim 1, wherein the outlet pipe has only one, two or three apertures.

8. An apparatus according to claim 1, wherein the outlet pipe has two, diametrically opposed apertures.

9. An apparatus according to claim 1, wherein the ratio of the total cross-sectional flow areas of the apertures to the cross-sectional flow area of the outlet pipe is in range from 1:4 to 1:8.

10. An apparatus according to claim 1, wherein the thickness of the radially outward side wall of the outlet pipe is in the range from 1% to 10% of the internal diameter of the outlet pipe.

11. An apparatus according to claim 1, wherein the apertures have side surfaces (12) formed by the thickness of the radially outward side wall of the outlet pipe, the side surfaces being angled relative to the respective radial directions of the outlet pipe at the side surfaces to generate the swirling flow.

12. An apparatus according to claim 1, wherein the angled side surfaces are tangential to, or parallel to the tangents (T) of, the inner surface of the radially outward side wall at the respective positions of the apertures.

13. An apparatus according to claim 1, wherein the inlet and outlet pipes have the same diameter.

14. An apparatus according to claim 1, wherein the inlet and outlet pipes extend horizontally.

15. A device for investigating the properties of a gas-liquid fluid mixture, the device comprising:
- an apparatus according to claim 1 for producing swirling flow in a gas-liquid fluid mixture,
- a conduit for receiving the swirling the flow, the conduit having a first constriction region providing a reduced conduit cross section, and
- a measurement assembly for determining one or more properties of the liquid as it flows through the constriction region.

16. An oil well or a gas well pipeline fitted with an apparatus according to claim 1.

17. An oil well or a gas well pipeline fitted with an apparatus according to claim 15.

* * * * *